(12) United States Patent  (10) Patent No.: US 8,243,443 B2
Tanaka et al.  (45) Date of Patent: Aug. 14, 2012

(54) FILTER MOUNTABLE ON DISPLAY DEVICE AND ELECTRONIC EQUIPMENT PROVIDED WITH DISPLAY DEVICE

(75) Inventors: Shintaro Tanaka, Osaka (JP); Akira Iwamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 206 days.

(21) Appl. No.: 12/872,249

(22) Filed: Aug. 31, 2010

(65) Prior Publication Data

US 2011/0075357 A1   Mar. 31, 2011

(30) Foreign Application Priority Data

Sep. 25, 2009  (JP) .................................. 2009-219985

(51) Int. Cl.
 *G06F 1/16* (2006.01)
(52) U.S. Cl. ...................... 361/679.58; 345/37; 359/891; 257/434; 349/138; 348/360
(58) Field of Classification Search .............. 345/6, 173, 345/37; 359/891, 614, 359; 257/43, 71, 257/72, 80, 434; 361/679.58, 679.21, 679.22, 361/679.48, 679.01, 818, 807; 349/106, 349/65, 114, 138, 123, 43, 113; 348/789, 348/340, 360, 207.99
See application file for complete search history.

(56) References Cited

U.S. PATENT DOCUMENTS

| 2004/0135740 A1 * | 7/2004 | Sato et al. ........................ 345/6 |
| 2009/0015957 A1 * | 1/2009 | Kamada et al. ............... 359/891 |
| 2011/0068334 A1 * | 3/2011 | Yamazaki et al. .............. 257/43 |

FOREIGN PATENT DOCUMENTS

JP  11-052876  2/1999
* cited by examiner

*Primary Examiner* — Hung Duong
(74) *Attorney, Agent, or Firm* — Hamre, Schumann, Mueller & Larson P.C.

(57) ABSTRACT

A filter 101 of the present application has flexibility. The filter 101 includes a left protruding portion 102, a right protruding portion 103, a lower protruding portion 104a, a lower protruding portion 104b, and an upper protruding portion 105. The electronic equipment of the present application includes a main portion 2 and a display portion 3. The display portion 3 includes a left groove 11a, a right groove 11b, a lower groove 12a, and a lower groove 12b. The left protruding portion 102 can be inserted in the left groove 11a. The right protruding portion 103 can be inserted in the right groove 11b. The lower protruding portion 104a can be inserted in the lower groove 12a. The lower protruding portion 104b can be inserted in the lower groove 12b. When the filter 101 is mounted on the display portion 3, the upper protruding portion 105 is positioned on the display frame 9. When the filter 101 is attached/detached with respect to the display portion 3, the upper protruding portion 105 is held, and hence, fingerprints can be prevented from adhering to the display surface of the filter 101.

10 Claims, 11 Drawing Sheets

FILTER MOUNTABLE ON DISPLAY DEVICE AND ELECTRONIC EQUIPMENT PROVIDED WITH DISPLAY DEVICE

BACKGROUND

1. Field

The present application relates to a filter mountable on a display device and electronic equipment provided with a display device on which a filter is mountable.

2. Description of Related Art

In recent years, for example, portable information processing apparatuses typified by notebook personal computers (hereinafter, referred to as "notebook computers") have been used in various fields for creating a variety of text, tables, or graphics. Further, the information processing apparatuses have been used in a number of fields as tools for communication through electronic mail. The information processing apparatuses often have been carried outdoors and used on the road due to the miniaturization and the reduction in thickness and weight.

The notebook computers are being used in various fields as described above. Therefore, the operation time of using a notebook computer by a user is becoming long, and a period of time, during which the user views a liquid crystal display mounted on the notebook computer, also is becoming long. Under such circumstances, the user feels fatigue and discomfort to the eyes when viewing the liquid crystal display for a long period of time.

JP 11 (1999)-52876 A discloses a configuration in which a filter capable of being taken up with a take-up portion is provided in a housing of a display portion of a notebook computer, and the filter is pulled out to cover a liquid crystal display surface, in order to alleviate discomfort and fatigue felt by the user.

However, with the configuration disclosed by JP 11-52876 A, the housing is enlarged, making the miniaturization and the reduction in thickness difficult.

SUMMARY

A filter of the present application includes: a rectangular light-transmitting portion transmitting visible light; a first protruding portion and a second protruding portion that are provided respectively at a pair of outer edges opposed to each other among the four sides constituting a periphery of the light-transmitting portion, and that protrude respectively from a first center line of an interval between the pair of outer edges in directions of the pair of outer edges; a third protruding portion that is provided at one outer edge orthogonal to the pair of outer edges among the four sides, and that protrudes from a second center line of the pair of outer edges in a direction of the one outer edge; and a fourth protruding portion that is provided at the other outer edge opposed to the one outer edge via the light-transmitting portion, and that protrudes from the second center line in a direction of the other outer edge.

Electronic equipment of the present application includes a main portion containing a signal processing portion that converts an information signal into a viewing signal, and a display portion that includes a display device capable of displaying an image based on the viewing signal and a housing defining an effective display area of the display device with an opening, wherein a filter is attachable/detachable with respect to the display portion. The electronic equipment includes: a first engagement portion and a second engagement portion capable of being engaged with a first protruding portion and a second protruding portion that are provided respectively at a pair of outer edges opposed to each other among four sides constituting a periphery of the light-transmitting portion, and that protrude respectively from a first center line of an interval between the pair of outer edges in directions of the pair of outer edges; a third engagement portion capable of being engaged with a third protruding portion that is provided at one outer edge orthogonal to the pair of outer edges among the four sides, and that protrudes from a second center line of the pair of outer edges in a direction of the one outer edge; a fourth engagement portion capable of being engaged with a fourth protruding portion that is provided at the other outer edge opposed to the one outer edge via the light-transmitting portion, and that protrudes from the second center line in a direction of the other outer edge; and a frame that allows the fourth protruding portion to come into contact therewith.

DETAILED DESCRIPTION OF THE EMBODIMENT

Embodiment

[1. Configuration of a Filter]

JP 11 (1999)-52876 A discloses a configuration in which a filter capable of being taken up with a take-up portion is provided in a housing of a display portion of a notebook computer, and the filter is pulled out to cover a liquid crystal display surface. In the configuration of taking up a filter as disclosed by JP 11 (1999)-52876 A, the filter may be deformed plastically in a curved shape. Thus, when the filter is pulled out of the take-up portion, the filter is curved with respect to the display portion, which may impart uncomfortable feeling to a user.

Further, in order to prevent the reflection of light from a display surface of a display portion of a notebook computer, limit the viewing angle of the display surface, etc., a filter capable of being attached to the display portion of the notebook computer is commercialized. With such a configuration, a user needs to press and pick up the surface of the filter with fingers when attaching/detaching the filter with respect to the display portion. Therefore, fingerprints and the like remain on the surface of the filter (in particular, a region for transmitting light from the display portion on the surface of the filter) and appear to float further due to a backlight of liquid crystal, and/or the contamination of the fingerprints and the like becomes conspicuous at a time of change in viewing angle, which imparts discomfort to the user.

The present embodiment discloses a filter capable of preventing the reflection of light from a display surface of a display portion displaying a viewing signal, limiting the viewing angle of the display surface, etc. Further, the present embodiment discloses electronic equipment with respect to which the filter can be attached/detached.

In the present embodiment, a notebook computer is illustrated as an example of the electronic equipment.

Figure 1:
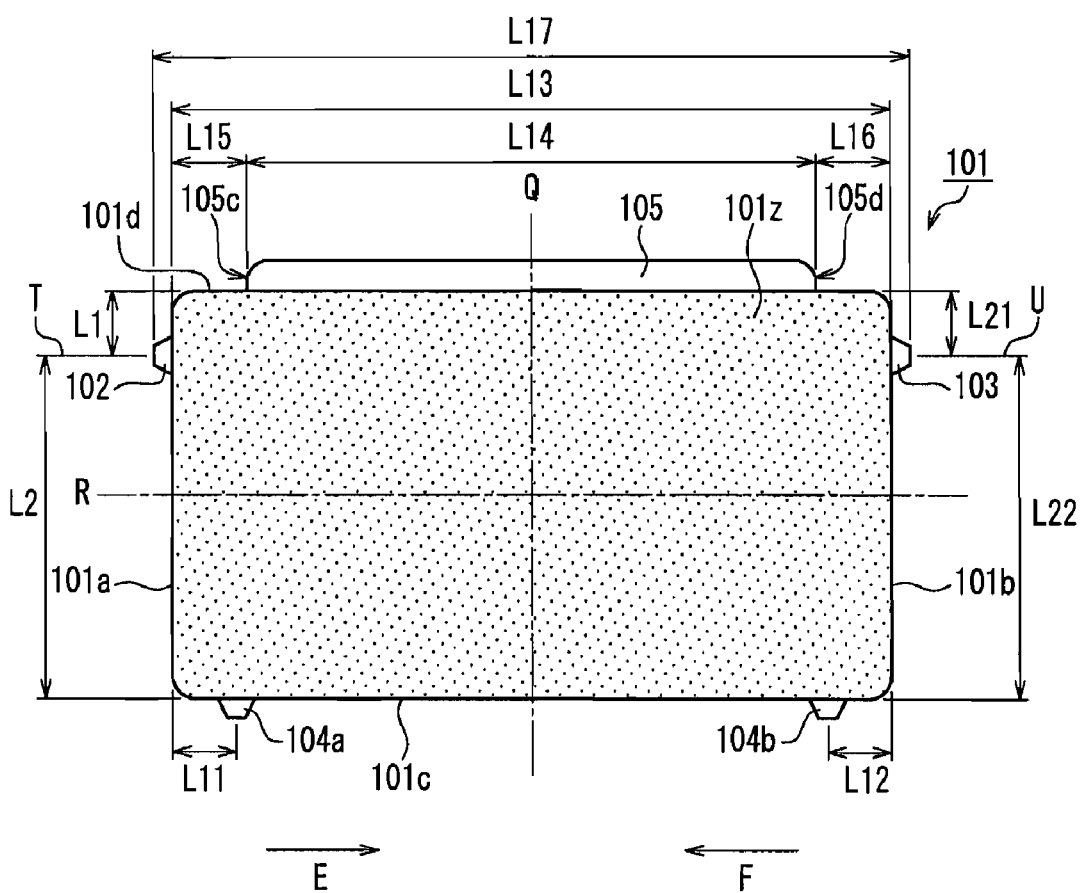
FIG. 1 is a plan view of a filter in one embodiment.

FIG. 1 is a plan view of a filter according to the present embodiment. FIG. 1 is a plan view of the filter according to the present embodiment seen from a surface through which light has passed. In a filter 101 shown in FIG. 1, a pair of opposed outer edges 101a and 101b and outer edges 101c and 101d orthogonal to the pair of outer edges 101a and 101b form a light-transmitting portion 101z basically in a rectangular shape.

Further, the filter 101 includes a first protruding portion 102, a second protruding portion 103, a third protruding portion 104a, a fourth protruding portion 104b, and a fifth protruding portion 105. The first protruding portion 102 protrudes from a center line Q of a separated distance between the outer edges 101a and 101b to the outer edge 101a. The second protruding portion 103 protrudes from the center line Q to the outer edge 101b. The third protruding portions 104a and 104b protrude from a center line R of a separated distance between the outer edges 101c and 101d to the outer edge 101c. The fifth protruding portion 105 protrudes from the center line R to the outer edge 101d.

In the following description, the outer edge 101a, the first protruding portion 102, the outer edge 101b, the second protruding portion 103, the outer edge 101c, the third and fourth protruding portions 104a and 104b, the outer edge 101d, and the fifth protruding portion 105 will be referred to as "left outer edge", "left protruding portion", "right outer edge", "right protruding portion", "lower outer edge", "lower protruding portions", and "upper outer edge", and "upper protruding portion", respectively.

A length L1 shown in FIG. 1 refers to a distance from a center line T of the left protruding portion 102 in a direction placed along the left outer edge 101a to the upper outer edge 101d. A length L21 shown in FIG. 1 refers to a distance from a center line U of the right protruding portion 103 in a direction placed along the right edge 101b to the upper outer edge 101d. A length L2 refers to a distance from the center line T to the lower outer edge 101c. A length L22 refers to a distance from the center line U to the lower outer edge 101c. The lengths L1 and L21 are equal to each other. The lengths L2 and L22 are equal to each other. The left protruding portion 102 and the right protruding portion 103 are formed in the same shape. More specifically, the left protruding portion 102 and the right protruding portion 103 are symmetric with respect to the center line Q. It is preferred that the left protruding portion 102 and the right protruding portion 103 are placed so that the lengths L1, L2, L21, and L22 have the following relationships.

$$L1 < (L1+L2)/2$$

$$L21 < (L21+L22)/2$$

A length L11 refers to a distance from a center line of the lower protruding portion 104a in a direction placed along the lower outer edge 101c to the left outer edge 101a. A length L12 refers to a distance from a center line of the lower protruding portion 104b in a direction placed along the lower outer edge 101c to the right outer edge 101b. The lengths L11 and L12 are equal to each other. More specifically, the lower protruding portion 104a and the lower protruding portion 104b are symmetric with respect to the center line Q. It is preferred that the lower protruding portions 104a and 104b are formed close to the center line Q by setting the lengths L11 and L12 to be large. Such a configuration allows the lower protruding portions 104a and 104b to be inserted in lower grooves 12a and 12b (described later) easily, which facilitates the operation of mounting the filter 101 on the notebook computer 1 (described later). If the lengths L11 and L12 are set to be too large, the lower protruding portions 104a and 104b are placed too closely, which renders the posture of the filter 101 unstable. For example, by setting the length L11 to be a half or less of the distance from the left outer edge 101a to the center line Q, and the length L12 to be a half or less of the distance from the right edge 101b to the center line Q, the posture of the filter 101 can be stabilized.

A length L14 (length in a direction placed along the upper outer edge 101d) of the upper protruding portion 105 preferably is set to be close to a length L13 of the upper outer edge 101d. In the present embodiment, the length L14 of the upper protruding portion 105 is set to be shorter than the length L13 by predetermined lengths L15 and L16, respectively, from the left outer edge 101a and the right outer edge 10b to the center line R.

The upper protruding portion 105 is a holding portion for a user to hold when mounting the filter 101 on the notebook computer 1 as described later. Thus, it is preferred that an end 105c of the upper protruding portion 105 is positioned in the vicinity of the left outer edge 101a. It also is preferred that an end 105d of the upper protruding portion 105 is positioned in the vicinity of the right outer edge 101b.

The filter 101 can be formed of a material such as polycarbonate, polyethylene terephthalate, or polymethacrylate. As the filter 101, generally, a flexible filter having a thickness of about 0.3 mm to about 2 mm can be used. The filter 101 has a light-transmitting portion 101z (hatched region in FIG. 1) in which layers with different optical characteristics are laminated.

The filter 101 has the light-transmitting portion 101z, and the protruding portions 102, 103, 104a, 104b, and 105. The protruding portions 102, 103, 104a, 104b, and 105 protrude from four outer edges (101a, 101b, 101c, 101d) on the periphery of the light-transmitting portion 101z in a plane direction of the surface of the light-emitting portion 101z. The left protruding portion 102, the right protruding portion 103, the lower protruding portion 104a, and the lower protruding portion 104b can be inserted in grooves (described later) provided in a display frame of the notebook computer 1. Thus, the filter 101 can be mounted on the display frame provided on the display portion of the notebook computer 1.

The filter 101 may be subjected to treatment such as the reduction in thickness by shaving the front surface and/or the back surface of the light-transmitting portion 101z. Such treatment allows the light-transmitting portion 101z to be curved easily, which makes it easy to insert the left protruding portion 102, the right protruding portion 103, the lower protruding portion 104a, and the lower protruding portion 104b in the grooves of the notebook computer 1.

The filter 101 is produced generally by cutting one film. Therefore, it is preferred that the left protruding portion 102, the right protruding portion 103, the lower protruding portion 104a, and the lower protruding portion 104b, and the light-transmitting portion 101z are formed of the same material in terms of the ease of production.

When inserting the left protruding portion 102, the right protruding portion 103, the lower protruding portion 104a, and the lower protruding portion 104b in the grooves of the display frame, respectively, the user holds the upper protruding portion 105 with the hands and curves the filter 101 in a direction to be separated from a display portion 3 of the notebook computer 1. At this time, even if the filter has the left protruding portion 102, right protruding portion 103, lower protruding portion 104a, and lower protruding portion 104b, the user has no choice but to touch the light-transmitting portion with the hands when attaching/detaching the filter. The filter 101 of the present embodiment is designed so that the user holds the upper protruding portion 105 protruding from the light-transmitting portion 101z and curves the filter 101. This enables the user to curve the filter 101 easily without touching the light-transmitting portion 101z. Thus, the present embodiment can prevent fingerprints and the like of the user from adhering to the light-transmitting portion 101z of the filter 101, alleviate the decrease in transmission amount of light in the light-transmitting portion 101z, and alleviate the degradation in viewability of the display portion. Further, the prevention of the adhesion of fingerprints to the light-transmitting portion 101z can enhance a fresh and neat impression.

Further, since the curving deformation of the filter 101 is temporary deformation at a time of mounting of the filter 1 on the notebook computer 1, the filter 101 tends not to be deformed plastically. Further, the filter 101 can be mounted on the notebook computer 1 even without deformation equal to or more than the flexibility of the filter 101 being given. Thus, the filter 101 mounted on the notebook computer 1 is unlikely to be subjected to curved plastic deformation.

Further, the filter 101 is one independent filter cut to a required area instead of having a shape of a long film as disclosed by JP 11 (1999)-52876 A, and hence, the notebook computer 1 will not be enlarged by mounting the filter 101 on the notebook computer 1. The user holds the upper protruding portion 105 with both hands as described above. Therefore, the antislipping treatment such as mat finishing with respect to the surface, the treatment of reducing the thickness of the upper protruding portion 105 in order to allow the filter 101 to be curved easily, and the like can be selected appropriately depending upon the flexibility and the like of the filter 101. Further, it is preferred that the upper protruding portion 105 is formed of the same material as that for the light-transmitting portion, similarly to the other protruding portions, in terms of low cost of production.

[2. Configuration of a Notebook Computer]

Figure 2:
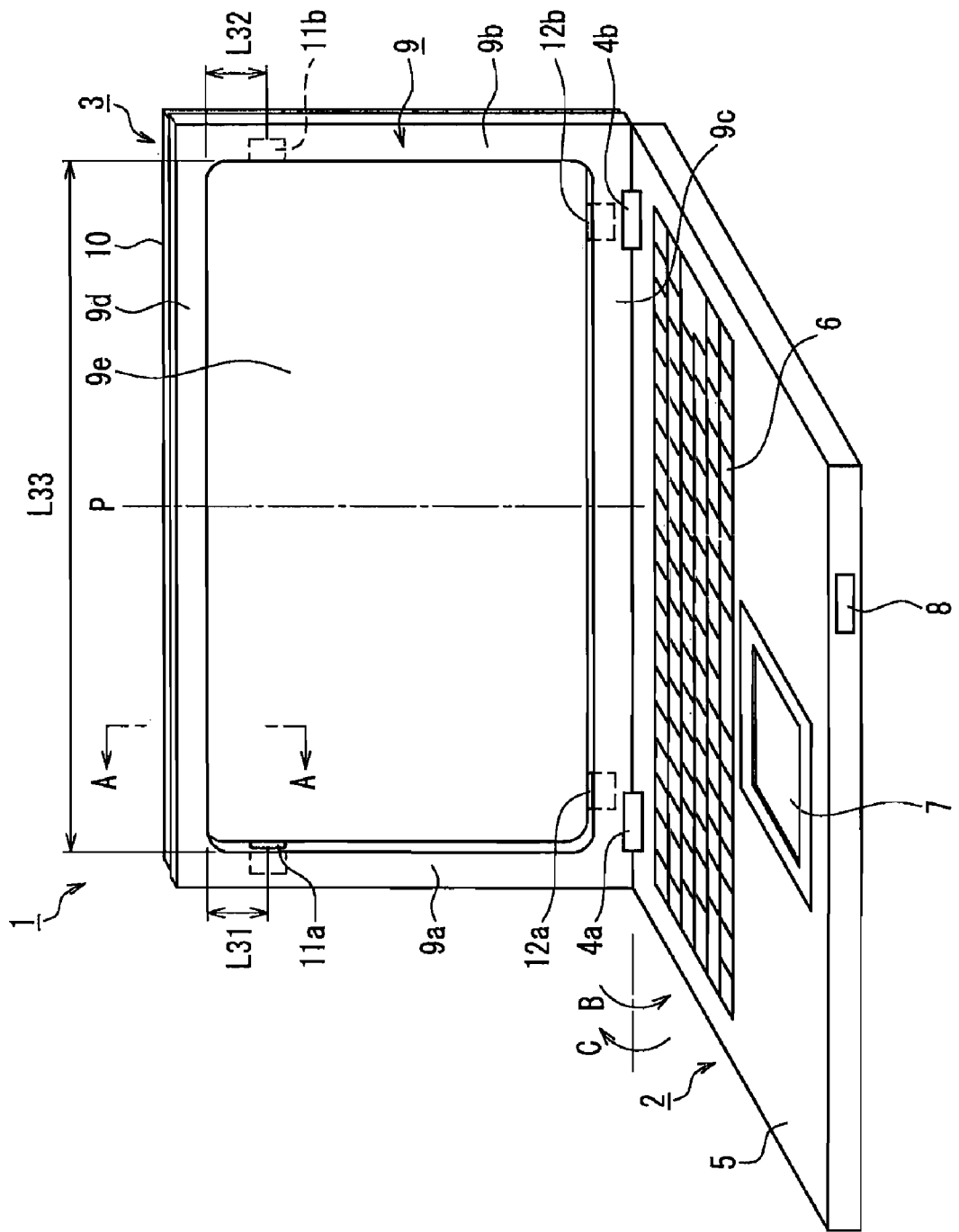
FIG. 2 is a perspective view of a notebook computer with no filter mounted thereon.
Figure 3:
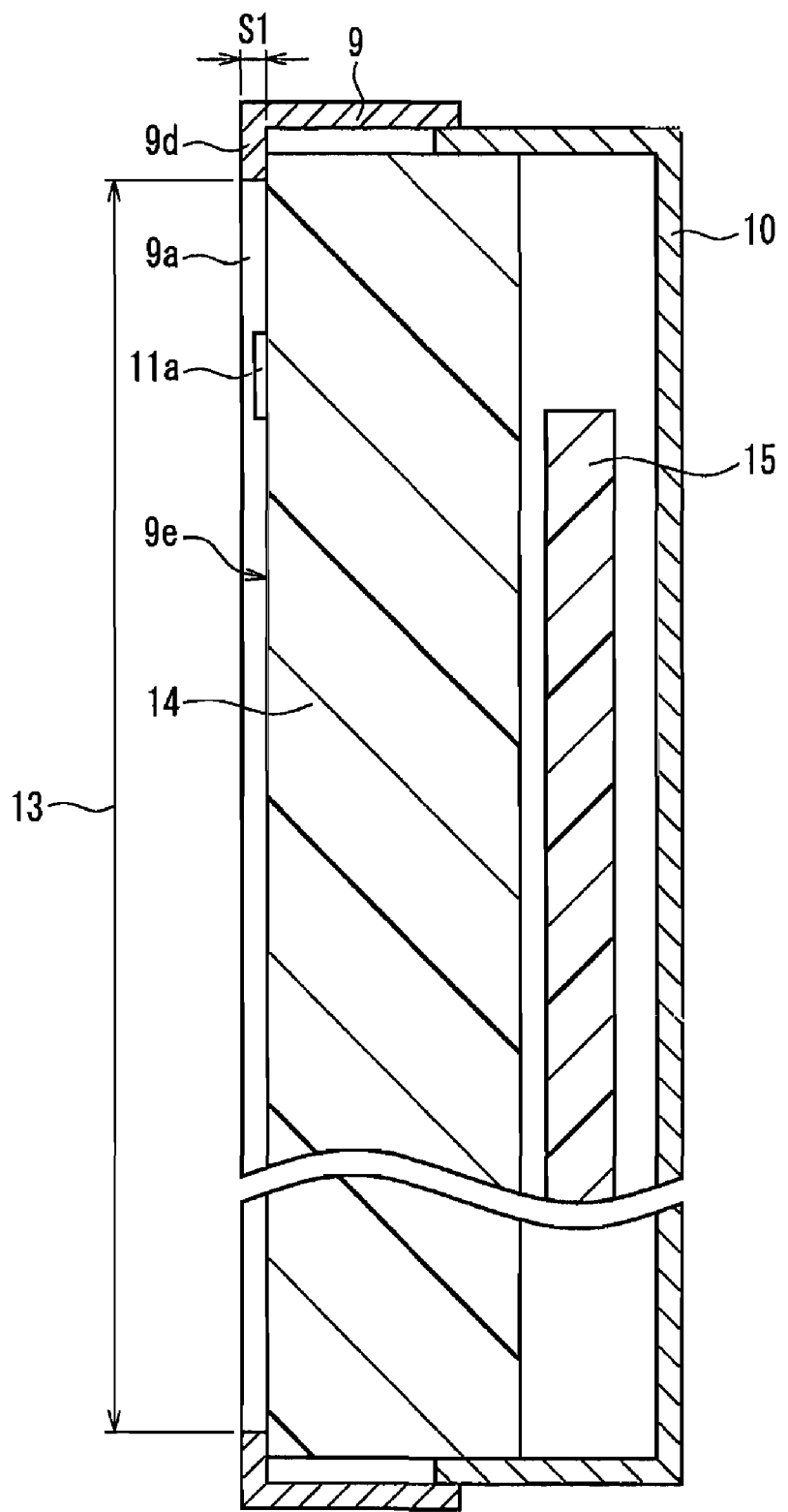
FIG. 3 is a cross-sectional view taken along the line A-A of FIG. 2.
Figure 4:
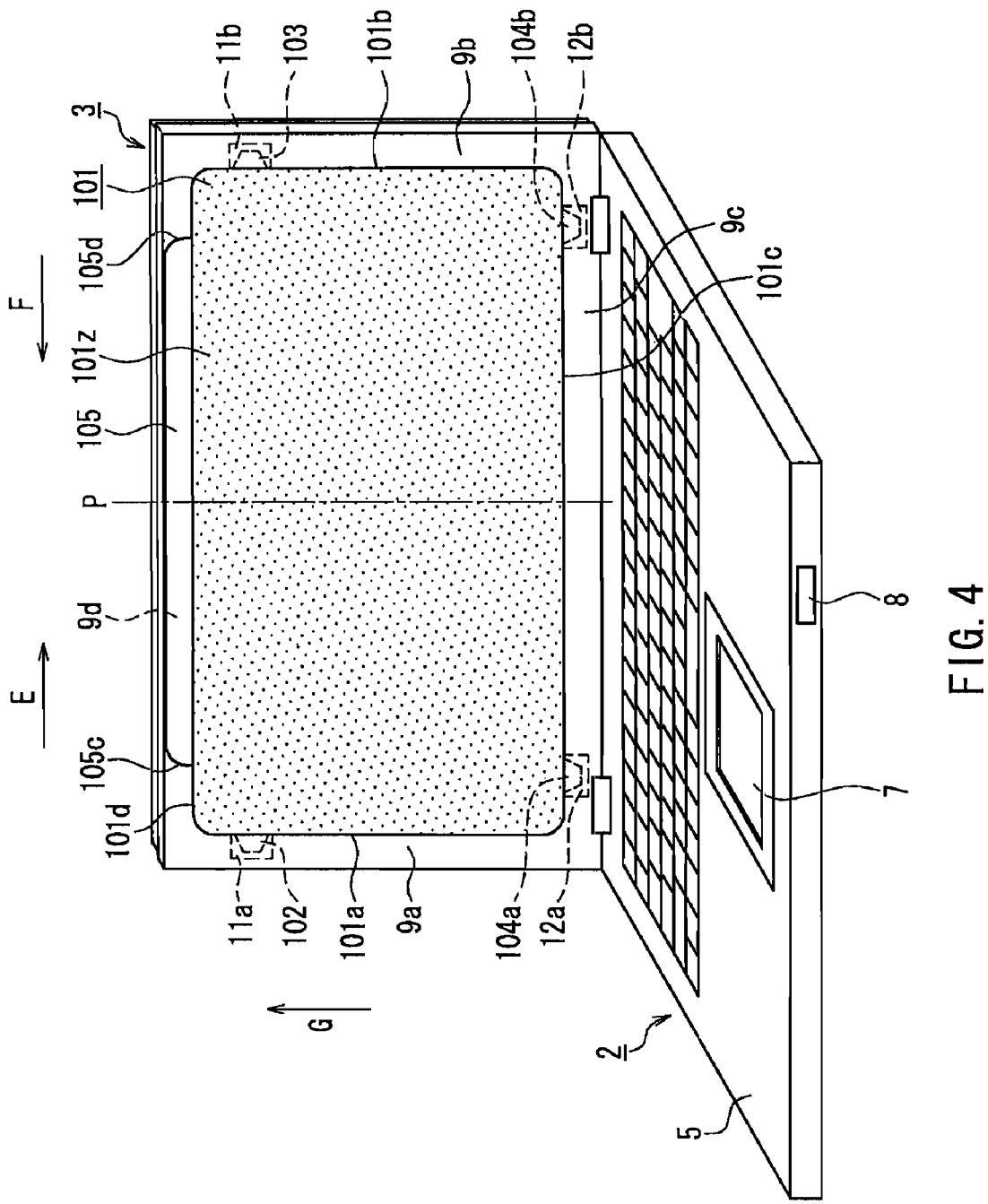
FIG. 4 is a perspective view of the notebook computer with the filter mounted thereon.

FIG. 2 is a perspective view showing one example of the notebook computer 1 on which the filter 101 can be mounted. FIG. 3 is a cross-sectional view taken along the line A-A of FIG. 2. FIG. 4 is a perspective view of the notebook computer 1 with the filter 101 mounted thereon.

The notebook computer 1 includes a main portion 2 and the display portion 3. The main portion 2 and the display portion 3 are axially supported by hinges 4a, 4b so as to be opened/closed in a direction indicated by an arrow B or C.

The main portion 2 includes a main housing 5, a keyboard 6, a pointing device 7, and a power switch 8. The keyboard 6 has a plurality of keys, and information can be input by pressing the keys. The pointing device 7 allows information to be input when the user touches an operation surface thereof with a finger or the like. The power switch 8 can switch on/off a power source of the notebook computer 1. The keyboard 6, the pointing device 7, and the power switch 8 are provided on the main housing 5. The main housing 5 contains a signal processing circuit (not shown) that converts a signal input to the keyboard 6, the pointing device 7, or the like into a viewing signal.

The display portion 3 is configured so that a display frame 9 and a back housing 10 are attached to each other by screwing, hook engagement, or the like (see FIG. 3). The back housing 10 can be formed of a metal material having light weight and stiffness, such as aluminum or magnesium. The back housing 10 can be formed of thermosetting or thermoplastic resin having high stiffness. The back housing 10 can be formed by a composite of the metal material and the resin material. The display frame 9 constitutes a display surface 9e by defining an effective display area 13 of a display device 14 shown in FIG. 3. As a material for the display frame 9, a resin material generally is used although the material for the back housing 10 is applicable. Further, the display device 14 can be realized with, for example, a liquid crystal display device.

The display frame 9 includes a left display frame 9a, a right display frame 9b, a lower display frame 9c, and an upper display frame 9d. The upper display frame 9d is positioned on the pointing device 7 side when the display portion 3 is rotated in the direction indicated by the arrow B from the position shown in FIG. 2 to approach the main portion 2. The left display frame 9a is positioned on the left side of the user watching the display surface 9e, when the notebook computer 1 is in a posture shown in FIG. 2. The right display frame 9b is positioned on the right side of the user watching the display surface 9e when the notebook computer 1 is in the posture shown in FIG. 2. The lower display frame 9c is positioned on the lower side of the user watching the display surface 9e when the notebook computer 1 is in the posture shown in FIG. 2.

The display frame 9 includes a left groove 11a, a right groove 11b, a lower groove 12a, and a lower groove 12b. The left groove 11a is provided in the vicinity of the boundary between the left display frame 9a and the display surface 9e and enables the left protruding portion 102 (see FIG. 1) of the filter 101 to be inserted therein. A length L31 from a center of the left groove 11a in a direction of a center line P to a boundary between the upper display frame 9d and the display surface 9e is equal to the length L1 (see FIG. 1) between the left protruding portion 102 and the upper outer edge 101d in the filter 101. The right groove 11b is provided in the vicinity of a boundary between the right display frame 9b and the display surface 9e and enables the right protruding portion 103 (see FIG. 1) of the filter 101 to be inserted therein. A length L32 from a center of the right groove 11b in the direction of the center line P to a boundary between the upper display frame 9d and the display surface 9e is equal to the length L21 (see FIG. 1) between the right protruding portion 103 and the upper outer edge 101d in the filter 101. The lower grooves 12a and 12b are provided in the vicinity of a boundary between the lower display frame 9c and the display surface 9e and enable the lower protruding portions 104a and 104b (see FIG. 1) of the filter 101 to be inserted therein.

The shape of the left groove 11a, the right groove 11b, the lower groove 12a, and the lower groove 12b is not particularly limited, as long as they are sized so as to allow the left protruding portion 102, the right protruding portion 103, the lower protruding portion 104a, and the lower protruding portion 104b to be inserted therein, respectively, and may be, for example, a rectangle, a trapezoid, or the like. Further, the depth of the left groove 11a, the right groove 11b, the lower groove 12a, and the lower groove 12b preferably is equal to or more than the protrusion length of each protruding portion to be inserted from the outer edge.

[3. Method for Attaching/Detaching a Filter 101]

Referring to FIGS. 1 to 4, a procedure for mounting the filter 101 on the notebook computer 1 will be described.

First, as shown in FIG. 2, the notebook computer 1 is opened.

Next, as shown in FIG. 4, the vicinity of the end 105c and the vicinity of the end 105d of the upper protruding portion 105 of the filter 101 are held with the fingers of both hands, and the lower protruding portion 104a is inserted in the lower groove 12a and the lower protruding portion 104b is inserted in the lower groove 12b.

Next, while the end 105c of the upper protruding portion 105 is being displaced in a direction indicated by an arrow E, and the end 105d is being displaced in a direction indicated by an arrow F, the upper side (the upper protruding portion 105 side) of the filter 101 is curved in a direction separated from the display device 14. Specifically, the upper side of the filter 101 is curved so that a straight length L17 between the left protruding portion 102 and the right protruding portion 103 shown in FIG. 1 becomes smaller than a length L33 between the left groove 11a and the right groove 11b shown in FIG. 2 (distance from the boundary between the left display frame 9a and the display surface 9e to the boundary between the right display frame 9b and the display surface 9e).

Next, the filter 101 is placed at a position where the left protruding portion 102 can be inserted in the left groove 11a and the right protruding portion 103 can be inserted in the right groove 11b.

Next, the filter 101 is released from both hands holding the upper protruding portion 105. When the filter 101 is released from both hands, the filter 101 is restored to an original shape with a restoring force caused by the flexibility of the filter 101. When the filter 101 returns to the original shape, the left protruding portion 102 is inserted in the left groove 11a and the right protruding portion 103 is inserted in the right groove 11b. The upper protruding portion 105 comes into contact with the upper display frame 9d.

Thus, as shown in FIG. 4, the mounting of the filter 101 on the display portion 3 is completed.

Since the light-transmitting portion 101z is set at substantially the same size as that of the effective display area 13 (see FIG. 3) defined by the display frame 9, the filter 101 can be mounted on the display portion 3 along the display surface 9e.

Further, when the filter 101 is mounted on the display portion 3, the upper protruding portion 105 comes into contact with the surface of the upper display frame 9d. Further, as shown in FIG. 3, there is a slight level difference 51 between the display surface 9e and the surface of the upper display frame 9d. The filter 101 of the present embodiment is formed of a flexible material, and hence, the vicinity of the boundary between the light-transmitting portion 101z and the upper protruding portion 105 is deformed along the shapes of the display surface 9e and the upper display frame 9d when the filter 101 is mounted on the display portion 3. This can suppress the deformation of the light-transmitting portion 101z, resulting in reducing the possibility of the optical characteristics of the filter 101 being degraded. Further, the deformation of the light-transmitting portion 101z can be suppressed, and hence, even if the filter 101 is composed of a plurality of laminated films, the possibility that the films peel from each other can be reduced.

Further, there is a low possibility that the lower protruding portions 104a and 104b come off from the lower grooves 12a and 12b due to the self weight of the filter 101, and there is a low possibility of the left protruding portion 102 and the right protruding portion 103 coming off from the left groove 11a and the right groove 11b due to the flexibility of the filter 101.

When the notebook computer 1 is closed, a slight gap is formed between the principal plane of the main portion 2 and the principal plane of the display portion 3. The thickness of the filter 101 of the present embodiment is at most several millimeters, which is smaller than at least the gap between the main portion 2 and the display portion 3. Thus, the notebook computer 1 can be closed while the filter 101 is mounted, and it is not necessary to remove the filter 101, for example, every time the notebook computer 1 is carried.

Accordingly, the filter 101 can be mounted on the display portion 3 of the notebook computer 1 properly.

The shape of the left protruding portion 102, the right protruding portion 103, the lower protruding portion 104a, and the lower protruding portion 104b is not particularly limited, as long as the left protruding portion 102, the right protruding portion 103, the lower protruding portion 104a, and the lower protruding portion 104b easily can be pulled out of the left groove 11a, the right groove 11b, the lower groove 12a, and the lower groove 12b. It is preferred that the shape of the left protruding portion 102, the right protruding portion 103, the lower protruding portion 104a, and the lower protruding portion 104b is a trapezoid (see FIG. 1, etc.) or a triangle whose width becomes narrow in a protruding direction, in order for the left protruding portion 102, the right protruding portion 103, the lower protruding portion 104a, and the lower protruding portion 104b to be inserted smoothly in the left groove 11a, the right groove 11b, the lower groove 12a, and the lower groove 12b.

Further, it is preferred that the lengths L1 and L21 shown in FIG. 1 are shorter, since the left protruding portion 102 easily is inserted in the left groove 11a and the right protruding portion 103 easily is inserted in the right groove 11b. Further, as the lengths L1 and L21 shown in FIG. 1 are set to be shorter, the mounting of the filter 101 on the display frame 9 can be stabilized.

Next, a procedure for detaching the filter 101 from the notebook computer 1 will be described.

First, in FIG. 4, the end 105c of the upper protruding portion 105 is displaced in the direction indicated by the arrow E or the end 105d of the upper protruding portion 105 is displaced in the direction indicated by the arrow F by sliding the vicinity of the end 105c and/or 105d of the upper protruding portion 105 with the fingers or the like with respect to the upper display frame 9d, taking advantage of the flexibility of the mounted filter 101, and thus, the ends 105c and 105d are moved closer to each other. Specifically, the upper protruding portion 105 and the vicinity thereof is curved so that the straight length L14 between the ends 105c and 105d of the upper protruding portion 105 is shortened. Thus, the upper protruding portion 105 is separated from the upper display frame 9d.

Next, the user holds the upper protruding portion 105 with both hands or one hand.

When the upper protruding portion 105 is displaced in a direction separated from the upper display frame 9d, the filter 101 is curved and the left protruding portion 102 comes off from the left groove 11a and the right protruding portion 103 comes off from the right groove 11b.

Next, the filter 101 is displaced in a direction indicated by an arrow G while the upper protruding portion 105 is being held, and thus, the lower protruding portion 104a comes off from the lower groove 12a and the lower protruding portion 104b comes off from the lower groove 12b.

Consequently, the filter 101 can be detached from the display portion 3.

[4. Effects of the Embodiment, Etc.]

According to the present embodiment, the filter 101 can be attached/detached with respect to the notebook computer 1 without the user touching the light-transmitting portion 101z which the user is viewing. Thus, when the filter 101 is attached/detached, the fingerprints and the like of the user can be prevented from adhering to the light-transmitting portion of the filter unlike the conventional example, and the viewability of the display device 14 can be prevented from being degraded. Further, the damages to functional thin films (for example, a reflection preventive film, etc. provided on the filter surface) caused by the touch of the light-transmitting portion 101z can be suppressed.

Further, it is preferred to provide the upper protruding portion 105 on the upper outer edge 101d of the filter 101, since the filter can be easily attached/detached with the fingers holding the upper protruding portion 105 from above. Further, the deformation of the filter 101 caused by bending of the upper portion due to the distortion of the upper protruding portion 105 is increased compared with that of the lower outer edge 101c by forming the left protruding portion 102 and the right protruding portion 103 from the left outer edge 101a and the right outer edge 101b of the filter 101. Therefore, the attachment/detachment of the filter 101 can be performed smoothly and easily without allowing the fingerprints of the user to adhere to the light-transmitting portion 101z.

Further, the filter 101 can be handled very easily since the filter 101 is formed of one independent film. For example, the filter 101 is formed of one independent film, so that curving plastic deformation is unlikely to occur in the filter 101, which stabilizes the mounting of the filter 101 on the notebook computer 1.

The filter 101 described in the above-mentioned embodiment can take another embodiment.

Modified Example 1

The length L14 (see FIG. 1) of the upper protruding portion 105 is substantially the same as the length L13 (see FIG. 1) of the upper outer edge 101d. Therefore, when the filter 101 is formed of, for example, a material having low flexibility, the restoring force of the upper protruding portion 105 generated at a time of attachment/detachment of the filter 101 with respect to the notebook computer 1 is too strong, which may cause difficulties in handling.

Further, for the purpose ensuring the closed state of the main portion 2 and the display portion 3, the notebook computer 1 is available in which a hook portion is provided at an upper side center or the like opposed to the hinges 4a and 4b on the display portion 3, and a concave portion with which the hook portion can be engaged is provided in the vicinity of the pointing device 7. In such a notebook computer, there is a possibility that the upper protruding portion 105 may interfere with the hook portion provided on the display portion 3, which may make it difficult for the filter 101 to be attached/detached with respect to the display portion 3.

Figure 5:
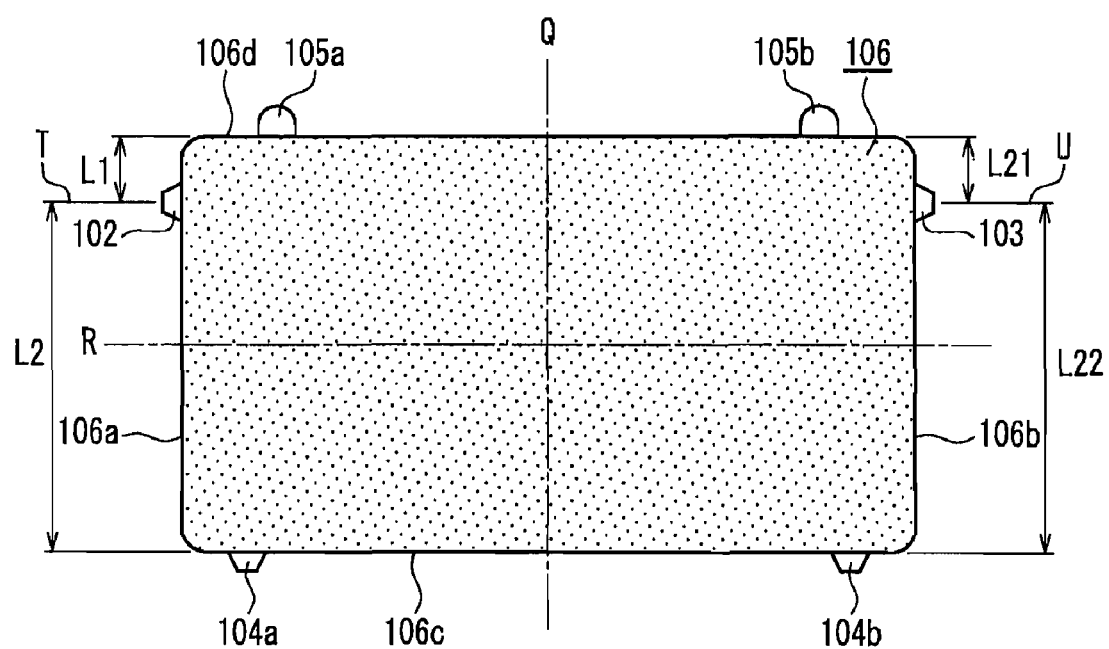
FIG. 5 is a plan view of a filter according to Modified Example 1.
Figure 6:
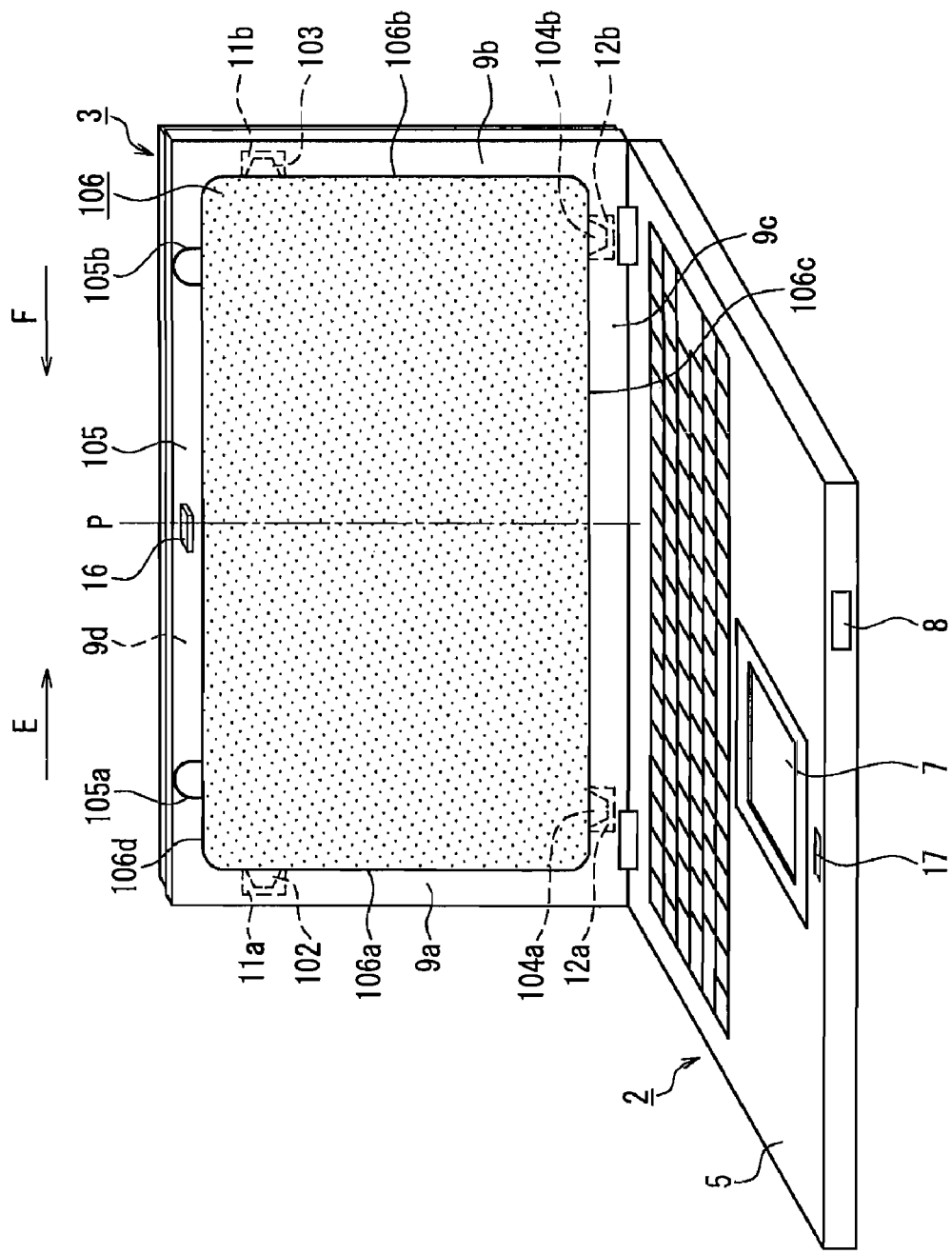
FIG. 6 is a perspective view of the notebook computer with the filter according to Modified Example 1 mounted thereon.

FIG. 5 is a plan view of the filter according to Modified Example 1. FIG. 6 is a perspective view of the notebook computer with the filter according to Modified Example 1 mounted thereon. As shown in FIG. 5, a filter 106 has upper protruding portions 105a and 105b independent from each other, in place of the upper protruding portion 105 in the filter 101. There is a gap between the upper protruding portions 105a and 105b. The left protruding portion 102, the right protruding portion 103, the lower protruding portion 104a, and the lower protruding portion 104b in the filter 106 have the same configurations as those of the protruding portions provided in the filter 101. Although the upper protruding portions 105a and 105b are formed in a substantially semicircular shape, the upper protruding portions 105a and 105b are not limited to the shape as long as they are placed independently at least along an upper outer edge 106d.

As shown in FIG. 5, due to the presence of the upper protruding portions 105a and 105b independent from each other, the restoring force of the filter 106 at a time of attachment/detachment of the filter 106 with respect to the notebook computer 1 can be weakened by the amount of the gap between the upper protruding portions 105a and 105b, even in the case where the filter 106 is formed of a material having a strong restoring force with respective to deformation (curving, etc.). This facilitates the attachment/detachment of the filter 106.

Further, as shown in FIG. 6, a hook portion 16 can be placed in the gap between the upper protruding portions 105a and 105b, and hence, the stability of the position of the filter 106 in a state where the main portion 2 and the display portion 3 are closed can be enhanced.

Modified Example 2

For example, a filter in which a transparent base such as glass is coated with a coloring material has the same optical characteristics between the front side and the back side. However, a filter that changes a viewing angle of the display device 14 or the like has optical characteristics different between the front side and the back side. In the case of the filters 101 and 106 of the above-mentioned embodiment, it is difficult to discriminate the front from the back of a filter mounted on the display portion 3, which may lead to the case where the originally intended filter characteristics cannot be exhibited.

Therefore, it is preferred that identifiers allowing the front and back of a filter to be mounted on the notebook computer 1 to be identified are realized by various protruding portions provided in the filters 101 and 106. Although specific examples of the identifiers will be described later, the following identification methods (a) to (e) can be applied alone or in an appropriate combination thereof.

(a) Identification method based on arrangement: the separated distance of a protruding portion provided at one of opposed outer edges of a filter from an outer edge parallel to the protrusion direction of the protruding portion is differentiated from that of a protruding portion provided at the other of the opposed outer edges of the film from the outer edge parallel to the protrusion direction of the protruding position. It should be noted that a plurality of protruding portions may be provided at one of the opposed outer edges.

(b) Identification method based on protrusion length: the protrusion lengths of protruding portions provided at a pair of opposed outer edges are differentiated.

(c) Identification method based on shape: the shapes of protruding portions provided at a pair of opposed outer edges are differentiated.

(d) Identification method based on coloring: the colors of protruding portions provided at a pair of opposed outer edges are differentiated.

(e) Identification method based on a character: a character (coating or inscription) such as "FRONT", "BACK", "RIGHT", or "LEFT" is displayed on a protruding portion provided at one outer edge.

It is preferred that the display device on which a filter is to be mounted also has determiners for determination in grooves or on a surface of the display frame 9 in accordance with the identifiers satisfying the above-mentioned identification methods (a) to (d), since the user can be given an instruction regarding normal mounting of the filter.

Figure 7:
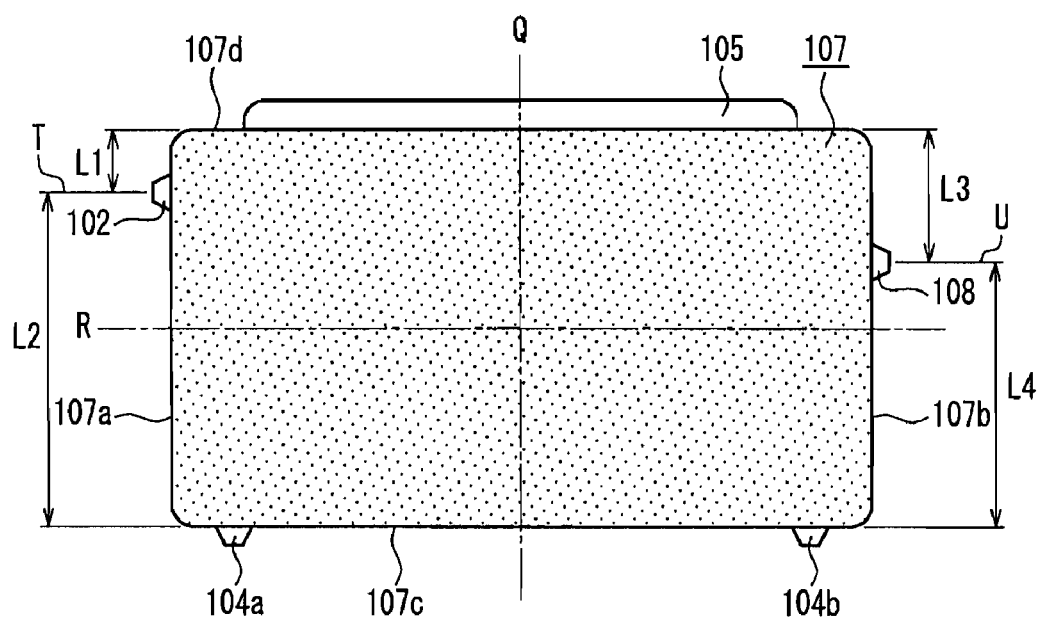
FIG. 7 is a plan view of the filter according to Modified Example 1.
Figure 8:
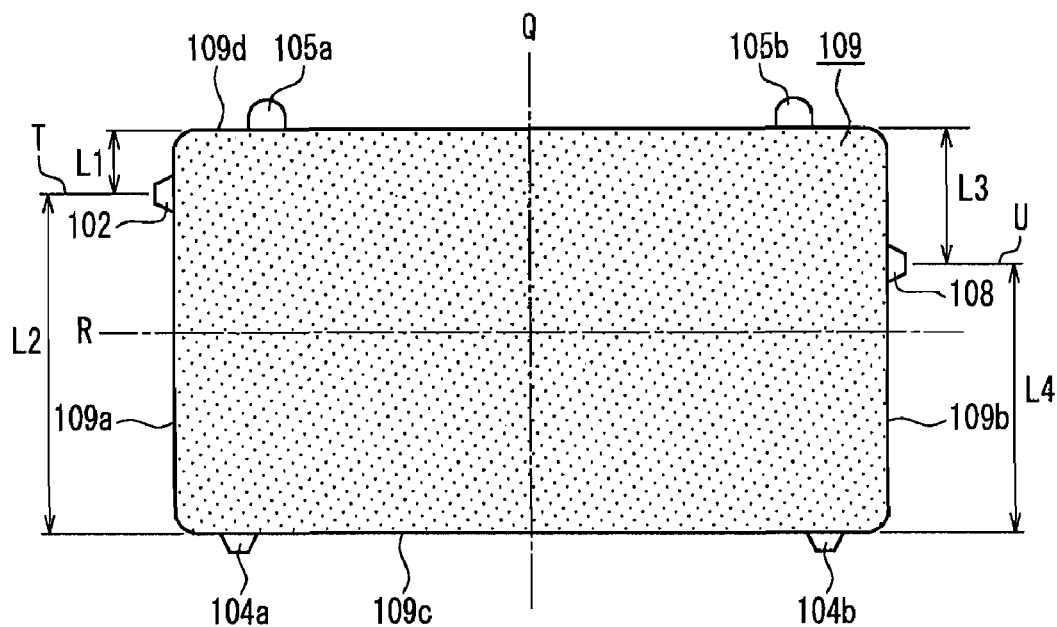
FIG. 8 is a plan view of a filter according to Modified Example 2.

FIGS. 7 and 8 are plan views of filters according to Modified Example 2. Each filter shown in FIGS. 7 and 8 has a configuration that can be mounted on the display portion 3 in a correct posture.

The upper protruding portion 105, the lower protruding portion 104a, and the lower protruding portion 104b of a filter 107 shown in FIG. 7 have the same configurations as those of the filter 101 shown in FIG. 1. The upper protruding portion 105a, the upper protruding portion 105b, the lower protruding portion 104a, and the lower protruding portion 104b of a filter 109 shown in FIG. 8 have the same configuration as those of the filter 106 shown in FIG. 5.

In the filter 107, the left protruding portion 102 and the right protruding portion 108 have the same shape, and protrude respectively from the center line Q beyond the left outer edge 107a and the right outer edge 107b. The left protruding portion 102 and the right protruding portion 108 are different from each other in the following respect: the length L1 between the center line T of the left protruding portion 102 along the left outer edge 107a and the upper edge 107d is different from a length L3 between a center line U of the right protruding portion 108 along the right outer edge 107b and the upper outer edge 107d. In the present embodiment, as an example, the left protruding portion 102 and the right protruding portion 108 are placed so as to satisfy L1<L3. The ratio between the length L1 and the length L3 can be set, for example, at L1:L3=1:1.5. As also illustrated in the present embodiment, the relationship of L3<(L3+L4)/2 is maintained for the above-mentioned reason.

Figure 11:
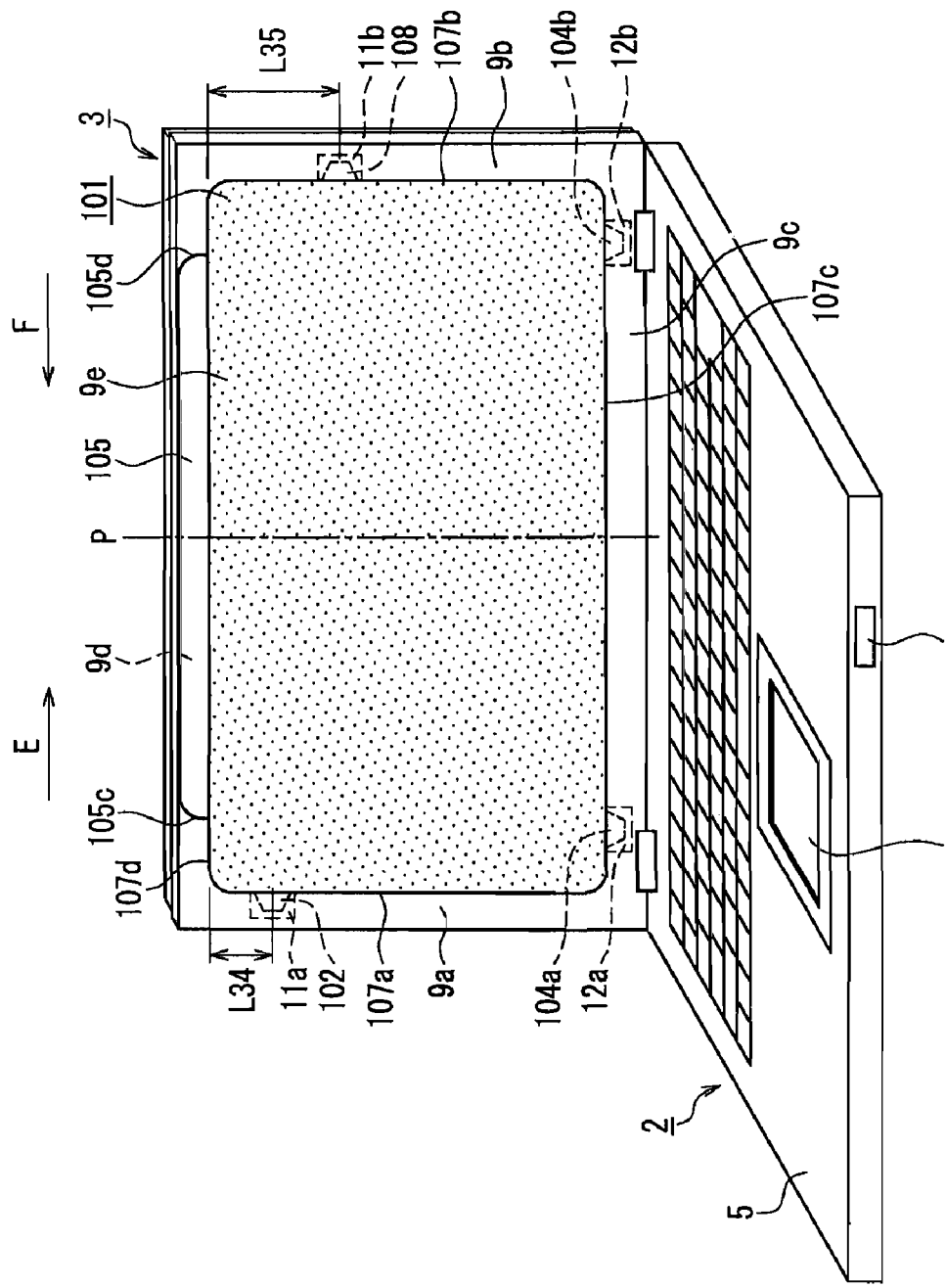
FIG. 11 is a perspective view of a notebook computer with the filter according to Modified Example 2 mounted thereon.

As shown in FIG. 11, the notebook computer 1 is provided with a left groove 11a, a right groove 11b, a lower groove 12a, and a lower groove 12b so that the filter 107 shown in FIG. 7 can be mounted on the notebook computer 1. More specifically, the left groove 11a and the right groove 11b are formed at positions so that a length L34 from the center of the left groove 11a in a direction of an axis P to a boundary between the upper display frame 9d and the display surface 9e, and a length L35 from the center of the right groove 11b in the direction of the axis P to a boundary between the upper display frame 9d and the display surface 9e satisfy the relationships: L34<L35, L34=L1, and L35=L3. This enables the filter 107 to be mounted on the display portion 3 only when the filter 107 is set in a correct posture relative to the front and back directions.

Figure 12:
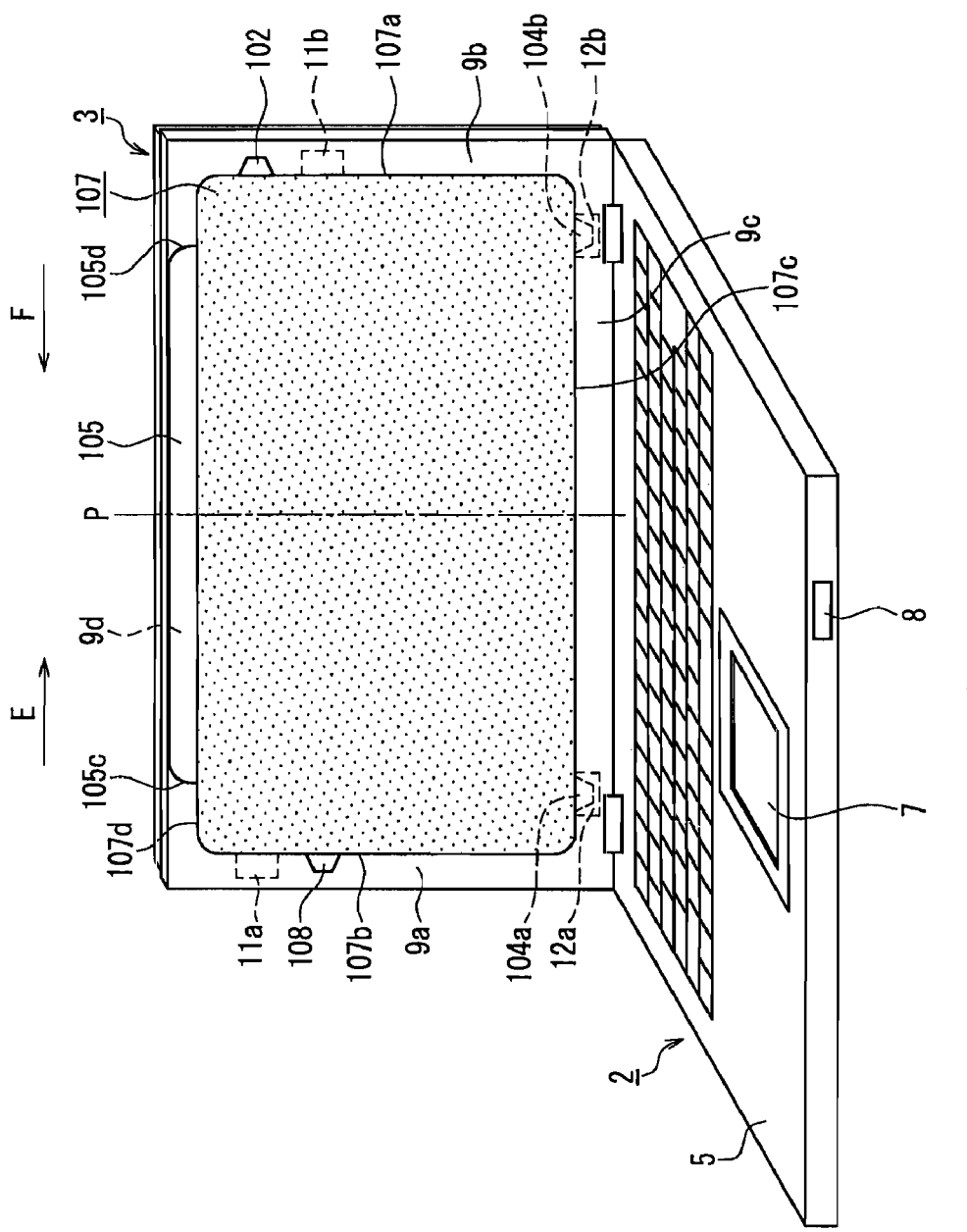
FIG. 12 is a perspective view of a notebook computer with the filter according to Modified Example 2 mounted in a wrong direction.

If an attempt is made to mount the filter 107 on the display portion 3 in a wrong posture relative to the front and back directions, the state shown in FIG. 12 is obtained. In the state shown in FIG. 12, the right protruding portion 108 is positioned on the left display frame 9a without being inserted in the left groove 11a. Further, the left protruding portion 102 is positioned on the right display frame 9b without being inserted in the right groove 11b. Thus, even if an attempt is made to mount the filter 107 on the display portion 3 in a wrong posture relative to the front and back directions as shown in FIG. 12, the filter 107 cannot be mounted.

Accordingly, the filter 107 of Modified Example 2 can be mounted on the display portion 3 only when the filter 107 is in a correct posture relative to the front and back directions, and desired filter characteristics can be obtained.

The left protruding portion 102, the right protruding portion 108, the lower protruding portion 104a, and the lower protruding portion 104b of the filter 109 shown in FIG. 8 have the same configurations as those of the filter 107, and the filter 109 is different from the filter 107 in that the upper protruding portion 105a and the upper protruding portion 105b are provided in place of the upper protruding portion 105. Thus, the front and back of the filter can be identified at a time of attachment in the same way as in the filter 107. Further, the filter 109 can be mounted on a notebook computer (see FIGS. 11 and 12) on which the filter 107 can be mounted.

The left protruding portion 102 and the right protruding portion 108 shown in FIGS. 7 and 8 are examples of identifiers capable of identifying the front and back of the filters 107 and 109. A method for identifying the front and back of the filters 107 and 109 using the left protruding portion 102 and the right protruding portion 108 corresponds to one example of the above-mentioned identification method (a).

The filter 107 is configured in such a manner that the length L1 from the upper outer edge 107d to the left protruding portion 102 is differentiated from the length L3 from the upper outer edge 107d to the right protruding portion 108 as means for identifying the front and back. Further, the filter 109 is configured in such a manner that the length L1 from the upper outer edge 109d to the left protruding portion 102 is differentiated from the length L3 from the upper outer edge 109d to the right protruding portion 108 as means for identifying the front and back. However, the portion at a shorter distance from the upper outer edge 107d or 109d may be the right protruding portion 108 instead of the left protruding portion 102. Further, for example, even in the configuration in which the distance between the left outer edge 107a or 109a and the lower protruding portion 104a is differentiated from the distance between the right outer edge 107b or 109b and the lower protruding portion 104b, the effects similar to those in the present modified example are obtained.

Modified Example 3

Figure 9:
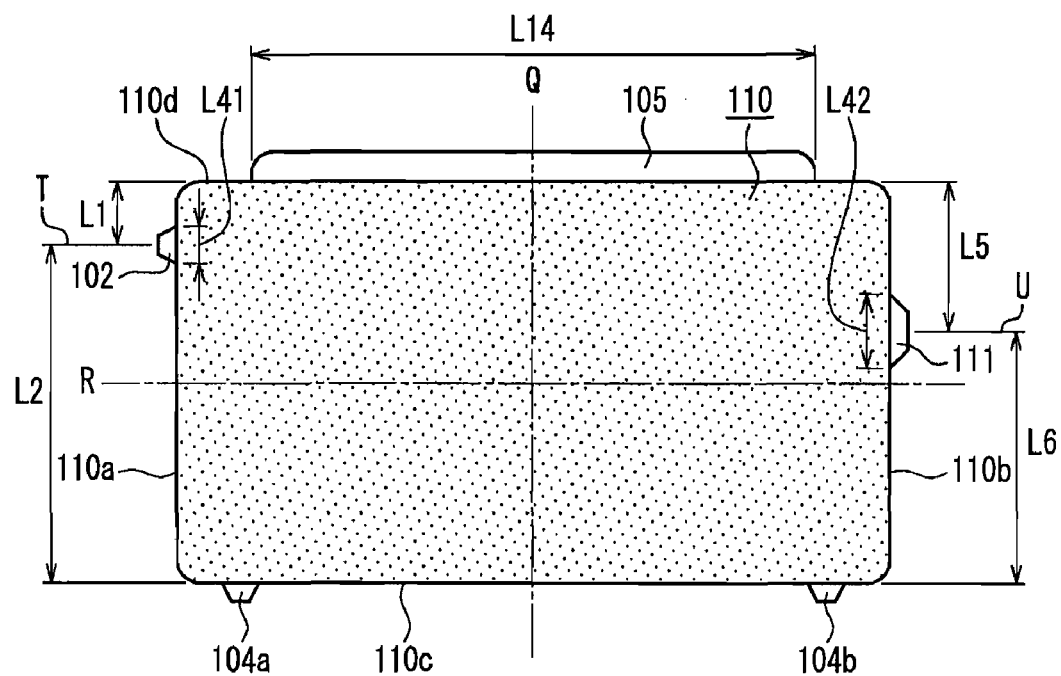
FIG. 9 is a plan view of a filter according to Modified Example 3.

FIG. 9 is a plan view of a filter according to Modified Example 3. The upper protruding portion 105, the lower protruding portion 104a, and the lower protruding portion 104b of a filter 110 shown in FIG. 9 have the same configurations as those of the filter 101 shown in FIG. 1. In the filter 110 shown in FIG. 9, the shape of the left protruding portion 102 is differentiated from the shape of a right protruding portion 111. The left protruding portion 102 and the right protruding portion 111 are designed so that a length L41 of the left protruding portion 102 along a left outer edge 110a and a length L42 of the right protruding portion 111 along a right outer edge 110b have the following relationship: L41<L42.

A length L5 and a length L6 have the following relationship: L5<(L5+L6)/2, where the length L5 is a distance between the center line U of the right protruding portion 111 along the right outer edge 110b and an upper outer edge 110d. The length L6 is a distance between the center line U of the right protruding portion 111 along the right outer edge 110b and a lower outer edge 110c. It should be noted that the length L42 of the right protruding portion 111 is less than a half of the length (L5+L6), and hence, the length L5 satisfies the above-mentioned relationship. However, in the case where the length L42 is close to the length (L5+L6) of the right outer edge 110b as in the length L14 of the upper protruding portion 105, the above-mentioned relationship has no meaning.

When the filter 110 is mounted on a notebook computer having a display frame with grooves in which the left protruding portion 102, the right protruding portion 111, the lower protruding portion 104a, and the lower protruding portion 104b of the filter 110 can be inserted, the front and back of the filter 110 can be identified due to the difference in shape between the left protruding portion 102 and the right protruding portion 111, and the filter 110 can be mounted in accordance with the filter characteristics.

Even when the left protruding portion 102 and the right protruding portion 111 are designed so that the lengths L41 and L42 have the following relationship: L41>L42, the front and back of the filter 110 can be identified, and the filter 110 can be mounted in accordance with the filter characteristics.

Further, even when the left protruding portion 102 and the right protruding portion 103 are placed so that the length L1 between the upper outer edge and the center line T and the length L5 between the upper outer edge 110d and the center line U satisfy the following relationship: L1>L5, the front and back of the filter 110 can be identified, and the filter 110 can be mounted in accordance with the filter characteristics.

Further, the length L1 between the upper outer edge 110d and the center line T may be set to be the same as the length L5 between the upper outer edge 110d and the center line U. In this case, it is necessary that the position (length L5) and the size (length L42) of the right protruding portion 111 satisfy the following relationship: L5≧(L42/2).

The left protruding portion 102 and the right protruding portion 111 shown in FIG. 9 are examples of identifiers allowing the front and back of the filter 110 to be identified. The method for identifying the front and back of the filter 110 using the left protruding portion 102 and the right protruding portion 111 corresponds to one example of the above-mentioned identification methods (a), (b), and (c).

Modified Example 4

Figure 10:
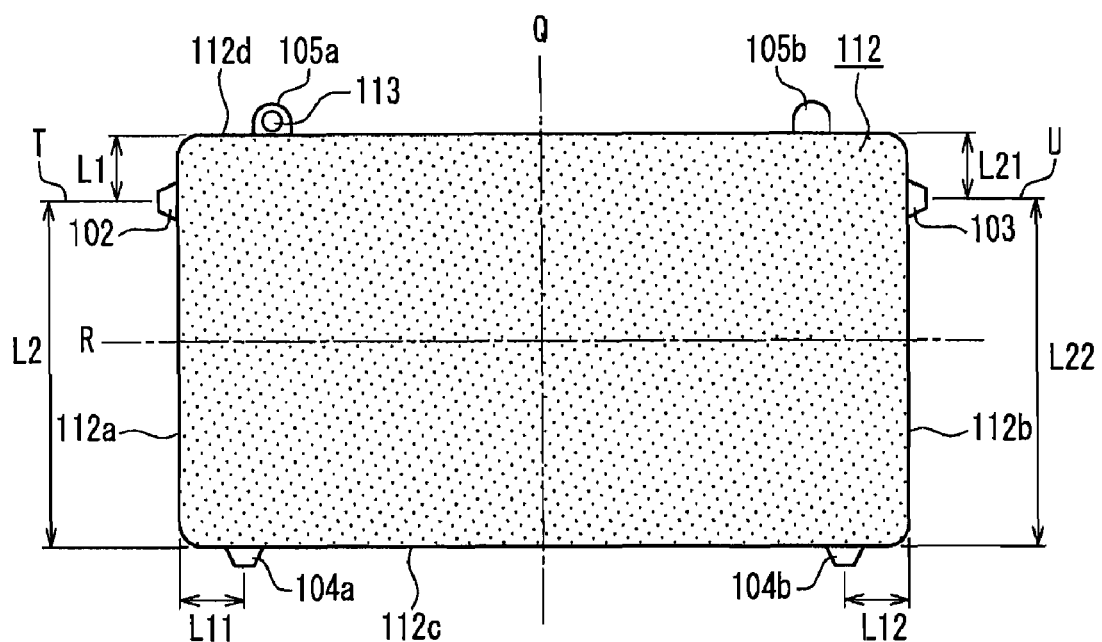
FIG. 10 is a plan view of a filter according to Modified Example 4.

FIG. 10 is a plan view of a filter according to Modified Example 4. The left protruding portion 102, the right protruding portion 103, the lower protruding portion 104a, and the lower protruding portion 104b of a filter 112 shown in FIG. 10 have the same configurations as those shown in FIG. 1. The left protruding portion 102, the right protruding portion 103, the lower protruding portion 104a, the lower protruding portion 104b, the upper protruding portion 105a, and the upper protruding portion 105b provided in the filter 112 have the same configurations as those, for example, shown in FIG. 5. The filter 112 is an example that can be mounted in accordance with the filter characteristics without arranging the length of a groove along the right outer edge and the length between the upper display frame 9d and the right groove. More specifically, the filter 112 has a through-hole 113, which allows the front and back to be identified, in the upper protruding portion 105a.

The user can view the through-hole 113 while mounting the filter 112 on the notebook computer 1. Therefore, the user can mount the filter 112 on the display portion 3 in a correct direction, if the user previously grasps the relationship between the front and back of the filter 112 and the direction of the through-hole 113. Thus, desired filter characteristics by the filter can be obtained.

The upper protruding portions 105a and 105b shown in FIG. 10 are examples of identifiers allowing the front and back of the filter 112 to be identified. The method for identifying front and back of the filter 112 using the upper protruding portions 105a and 105b corresponds to one example of the above-mentioned identification method (c).

Although the filter 112 has the through-hole 113 in the upper protruding portion 105a on the left side, the front and back of the filter can be identified through visual inspection or finger touch even if the upper protruding portion 105b on the right side has a through-hole.

Further, it is preferred that the upper display frame 9d has a configuration in which a mark is displayed at a position corresponding to the through-hole 113. It is preferred that the mark is displayed at a position that overlaps the through-hole 113 when the filter 112 is mounted on the display portion 3 in correct front and back directions.

Further, it is preferred that the upper display frame 9d has a positioning protrusion capable of being inserted in the through-hole 113. It is preferred that the positioning protrusion is formed so as to be fitted in the through-hole 113 when the filter 112 is mounted on the display portion 3 in correct front and back directions.

Further, the function of identifying the front and back of the filter 112 is not limited to the configuration with the through-hole 113, and various configurations can be adopted.

For example, a convex protrusion may be provided on any surface of the upper protruding portions 105a and 105b shown in FIG. 5. For example, by providing a convex protrusion on the upper protruding portion 105a or 105b on a plane identical to the surface of the filter 106, the user can identify the front and back of the filter based on whether the convex protrusion can be viewed or not. Further, in the case where a convex protrusion is provided, for example, the user sandwiches the upper protruding portion 105a or 105b between the thumb and the forefinger and determines the presence/absence of the convex protrusion based on the finger touch, and thus, can identify the front and back of the filter. It is preferred that the convex protrusion has a height that will not interfere with the main portion 2 when the notebook computer is closed while the filter 106 is mounted on the display portion 3 (height that will not hinder the transition of the notebook computer to the closed state even when the convex protrusion interferes with the main portion 2). One of the upper protruding portions 105a and 105b may have a convex protrusion, and the other may have a concave portion such as a through-hole. Further, in the case of the configuration in which one upper protruding portion 105 is provided as in the filter 107 shown in FIG. 7, one of the ends 105c and 105d and the vicinity thereof may have a convex protrusion, or one of the ends and the vicinity thereof may have a convex protrusion and the other may have a concave portion. The method for identifying the front and back of the filter using this configuration corresponds to one example of the above-mentioned identification method (c).

Further, in the case of a filter having a plurality of upper protruding portions 105a and 105b independent from each other as shown in FIG. 5, one of the upper protruding portions 105a and 105b is colored (the other upper protruding portion is rendered transparent), or the upper protruding portions 105a and 105b may be colored in different colors. With such a configuration, the user can identify the front and back of the filter by grasping the colored state of the upper protruding portions 105a and 105b through visual inspection. The method for identifying the front and back of a filter using this configuration corresponds to one example of the above-mentioned identification method (d).

Further, in the case of the configuration in which one upper protruding portion 105 is provided as in the filter 107 shown in FIG. 7, one of the ends 105c and 105d and the vicinity thereof are colored (the other end is rendered transparent), or both the ends 105c and 105d may be colored in different colors. With such a configuration, the user can identify the front and back of the filter by grasping the colored state of the ends 105c and 105d through visual inspection. The method for identifying the front and back of a filter using this configuration corresponds to one example of the above-mentioned identification method (d).

Further, in the left protruding portion 102 and the right protruding portion 103 shown in FIG. 6, the lengths L1 and L21 are set to be the same. However, as in the filter 107 shown in FIG. 7, the lengths from the upper edge 107d may be differentiated as in the lengths L1 and L3. With such a configuration, the user can identify the front and back of a filter by grasping the positions of the left protruding portion 102 and the right protruding portion 103 through visual inspection or finger touch. The method for identifying the front and back of a filter using this configuration corresponds to one example of the above-mentioned identification method (a).

Further, the left protruding portion 102 and the right protruding portion 103 shown in FIGS. 1 and 5 have the same size. However, as in the filter 110 shown in FIG. 9, the length L41 of the left protruding portion may be differentiated from the length L42 of the right protruding portion. With such a configuration, the user can identify the front and back of a filter by grasping the sizes of the left protruding portion 102 and the right protruding portion 103 through visual inspection or finger touch. The method for identifying the front and back of a filter using this configuration corresponds to one example of the above-mentioned identification methods (b) and (c).

Further, in the lower protruding portions 104a and 104b shown in FIG. 10, the length L11 from the lower protruding portion 104a to the left outer edge 112a is set to be the same as the length L12 from the lower protruding portion 104b to the right outer edge 112b. However, the lower protruding portions 104a and 104b may be placed at different distances from the respective outer edges. With such a configuration, the user can identify the front and back of a filter when attaching the lower protruding portions 104a and 104b through visual inspection or finger touch. The method for identifying the front and back of a filter using this configuration corresponds to one example of the above-mentioned identification method (a).

Further, even when the upper protruding portion 105 is placed so that the length L15 is different from the length L16 in FIG. 1, the user can identify the front and back of a filter by grasping the position of the upper protruding portion 105 through visual inspection or finger touch. The method for identifying the front and back of a filter using this configuration corresponds to one example of the above-mentioned identification method (a).

Further, in the case where the upper protruding portion 105 is placed at a position where the length L15 is different from the length L16 in FIG. 1, it is preferred that marks are displayed at positions corresponding to the ends 105c and 105d when the filter is mounted on the display portion 3 in correct front and back directions in the upper display frame 9d.

Further, even when the lower protruding portions 104a and 104b are placed at positions where the length L11 is different from the length L12 in FIG. 1, the user can identify the front and back of a filter when attaching the lower protruding portions 104a and 104b through visual inspection or finger touch. The method for identifying the front and back of a filter using this configuration corresponds to one example of the above-mentioned identification method (a).

Further, although the upper protruding portions 105a and 105b shown in FIG. 5 have the same shape, if the shape of the upper protruding portion 105a is differentiated from the shape of the upper protruding portion 105b, the user can identify the front and back of a filter by grasping the shape of a filter through visual inspection or finger touch. Specifically, one of the upper protruding portions 105a and 105b can be formed in a rectangular shape, and the other can be formed in a semi-circular shape, for example. The method for identifying the front and back of a filter using this configuration corresponds to one example of the above-mentioned identification method (c).

Further, in the case of differentiating the shape of the upper protruding portion 105a from the shape of the upper protruding portion 105b in FIG. 5, it is preferred that marks having the same shapes as the outer shapes of the upper protruding portions 105a and 105b are displayed at positions corresponding to the upper protruding portions 105a and 105b, when the filter is mounted on the display portion 3 in correct front and back directions in the upper display frame 9d.

Further, if the number of the left protruding portions 102 is differentiated from the number of the right protruding portions 103, the user can identify the front and back of a filter by grasping the number of the left protruding portions 102 and the number of the right protruding portions 103 through visual inspection or finger touch.

Further, if the character "FRONT" is displayed on a plane identical with the front surface of the filter and the character "BACK" is displayed on a plane identical with the back surface of the filter in the upper protruding portions 105, 105a, and 105b, the user can identify the front and back of a filter through visual inspection. With such a configuration, the user can identify the front and back of a filter through visual inspection of only a filter, and hence, the user can grasp the front and back of a filter before mounting the filter on the display portion 3, which can decrease the possibility that mounting in the wrong front and back directions occurs. The method for identifying the front and back of a filter using this configuration corresponds to one example of the above-mentioned identification method (e).

Further, the character "LEFT" may be displayed on the left protruding portion 102 and the character "RIGHT" may be displayed on the right protruding portion 103. With such a configuration, in the case where the user attempts to mount the filter 101 on the display portion 3 in wrong front and back directions, for example, the characters displayed on the left protruding portion 102 and the right protruding portion 103 look inverted to the user. The user mount the filter 101 on the display portion 3 in directions in which the characters displayed on the left protruding portion 102 and the right protruding portion 103 are not inverted. Consequently, the filter 101 is mounted on the display portion 3 in correct front and back directions. The method for identifying the front and back of a filter using this configuration corresponds to one example of the above-mentioned identification method (e).

Further, in the configuration in which the character "LEFT" is displayed on the left protruding portion 102, and the character "RIGHT" is displayed on the right protruding portion 103, the left protruding portion 102 is inserted in the left groove 11a and the right protruding portion 103 is inserted in the right groove 11b when the filter 101 is mounted on the display portion 3. Therefore, the characters displayed on the left protruding portion 102 and the right protruding portion 103 cannot be visually recognized. When the user is operating a notebook computer while viewing an image displayed in an effective display area of the display portion 3, the characters displayed on the left protruding portion 102 and the right protruding portion do not come into sight of the user. Consequently, the operation efficiency of the user is not degraded. The method for identifying the front and back of a filter using this configuration corresponds to one example of the above-mentioned identification method (e).

In order to enable the front and back of a filter to be identified, various configurations are illustrated in Modified Example 4. However, as long as at least one of the left protruding portion, the right protruding portion, the lower protruding portion, and the upper protruding portion is formed at asymmetric positions and/or in asymmetric shapes with respect to the center line Q, the front and back of a filter can be identified.

In the above-mentioned embodiment, the notebook computer 1 is provided with grooves in which the left protruding portion 102, the right protruding portion 103, the lower protruding portion 104a, and the lower protruding portion 104b of the filter 101 can be inserted. However, for example, holes may be adopted instead of the grooves. Other shapes or configurations may be adopted as long as they allow at least the left protruding portion 102, the right protruding portion 103, the lower protruding portion 104a, and the lower protruding portion 104b of the filter 101 to be inserted therein.

Further, in the present embodiment, two lower protruding portions (lower protruding portions 104a and 104b) and two lower grooves (lower grooves 12a and 12b) are provided. However, one lower protruding portion and one lower groove may be provided. In the case where one lower protruding portion is provided in the filter 101, the lower protruding portion preferably is placed at the center of the lower outer edge 101c in the direction of the center line R (position overlapping the center line Q). In the case where one lower groove is provided in the display portion 3, the lower groove preferably is placed at the center of the lower display frame 9c in the direction of the center line R (position overlapping the center line P). By placing the lower protruding portion and the lower groove in such a manner, the posture of the filter 101 mounted on the notebook computer 1 is stabilized. If the posture of the filter 101 mounted on the notebook computer 1 can be stabilized, one lower protruding portion and one lower groove may be placed at a position shifted from the center lines P and Q in the direction of the center line R, instead of the position overlapping the center lines P and Q.

Further, in the present embodiment, a notebook computer is exemplified as electronic equipment. However, the electronic equipment may be, for example, a monitor, a portable information terminal device, a portable telephone terminal, a portable game machine, or the like, which can be connected to a desktop personal computer.

Further, the left protruding portion 102 in the present embodiment is one example of a first protruding portion. Each of the right protruding portions 103, 108, and 111 in the present embodiment is one example of a second protruding portion. Each of the lower protruding portions 104a and 104b in the present embodiment is one example of a third protruding portion. Each of the upper protruding portions 105, 105a, and 105b in the present embodiment is one example of a fourth protruding portion. The upper protruding portions 105a and 105b in the present embodiment correspond to one example of a plurality of protruding portions. The light-transmitting portion 101z in the present embodiment is one example of a light-transmitting portion. The left outer edges 101a, 106a, 107a, 109a, 110a, 112a and the right outer edges 101b, 106b, 107b, 109b, 110b, 112b in the present embodiment respectively correspond to one example of a pair of outer edges. Each of the lower outer edges 101c, 106c, 107c, 109c, 110c, and 112c in the present embodiment is one example of one outer edge. Each of the upper outer edges 101d, 106d, 107d, 109d, 110d, and 112d in the present embodiment is one example of the other outer edge. The center line Q in the present embodiment is one example of a first center line. The center line R in the present embodiment is one example of a second center line. The center line T in the present embodiment is one example of a third center line. The center line U in the present embodiment is one example of a fourth center line. The length L41 in the present embodiment is one example of a first protrusion width. The length L42 in the present embodiment is one example of a second protrusion width. The through-hole 113 in the present embodiment is one example of an identifier. The left groove 11a in the present embodiment is one example of a first engagement portion. The right groove 11b in the present embodiment is one example of a second engagement portion. Each of the lower grooves 12a and 12b in the present embodiment is one example of a third engagement portion. The upper display frame 9d in the present embodiment is one example of a frame.

The present application may be embodied in other forms without departing from the spirit or essential characteristics thereof. The embodiments disclosed in this application are to be considered in all respects as illustrative and not limiting. The scope of the present application is indicated by the appended claims rather than by the foregoing description, and all changes which come within the meaning and range of equivalency of the claims are intended to be embraced therein.

What is claimed is:

1. A filter comprising:
   a rectangular light-transmitting portion transmitting visible light;
   a first protruding portion and a second protruding portion that are provided respectively at a pair of outer edges opposed to each other among four sides constituting a periphery of the light-transmitting portion, and that protrude respectively from a first center line of an interval between the pair of outer edges in directions of the pair of outer edges;
   a third protruding portion that is provided at one outer edge orthogonal to the pair of outer edges among the four sides, and that protrudes from a second center line of the pair of outer edges in a direction of the one outer edge; and
   a fourth protruding portion that is provided at the other outer edge opposed to the one outer edge via the light-transmitting portion, and that protrudes from the second center line in a direction of the other outer edge.

2. The filter according to claim 1, wherein the first protruding portion, the second protruding portion, the third protruding portion, and the fourth protruding portion are made of the same material as that for the light-transmitting portion.

3. The filter according to claim 1, wherein the first protruding portion, the second protruding portion, the third protruding portion, and the fourth protruding portion are identifiers capable of identifying front and back of the filter.

4. The filter according to claim 3, wherein the identifiers include protruding portions in such a manner that a separated distance between the one outer edge and each of a third center line in a direction parallel to a protrusion direction of the first protruding portion and a fourth center line in a direction parallel to a protrusion direction of the second protruding portion is set to be shorter than a distance between the other outer edge and each of the third center line and the fourth center line.

5. The filter according to claim 3, wherein the identifiers include the first protruding portion having a first protrusion width orthogonal to the protrusion direction of the first protruding portion and a second protruding portion having a second protrusion width orthogonal to the protrusion direction of the second protruding portion and different from the first protrusion width.

6. The filter according to claim 3, wherein, in the identifiers, a distance between the third center line and the one outer edge is different from a distance between the fourth center line and the one outer edge.

7. The filter according to claim 3, wherein the identifiers include an identifier for identifying a plane on which the visible light is output from the light-transmitting portion is provided at the fourth protruding portion.

8. The filter according to claim 3, wherein the identifiers include a plurality of separated independent protruding portions.

9. The filter according to claim 3, wherein the identifiers are formed at asymmetric positions and/or in asymmetric shapes with respect to the first center line.

10. Electronic equipment including a main portion containing a signal processing portion that converts an information signal into a viewing signal, and a display portion that includes a display device capable of displaying an image based on the viewing signal and a housing defining an effective display area of the display device with an opening, wherein a filter is attachable/detachable with respect to the display portion, the electronic equipment comprising:

a first engagement portion and a second engagement portion capable of being engaged with a first protruding portion and a second protruding portion that are provided respectively at a pair of outer edges opposed to each other among four sides constituting a periphery of the light-transmitting portion, and that protrude respectively from a first center line of an interval between the pair of outer edges in directions of the pair of outer edges;

a third engagement portion capable of being engaged with a third protruding portion that is provided at one outer edge orthogonal to the pair of outer edges among the four sides, and that protrudes from a second center line of the pair of outer edges in a direction of the one outer edge;

a fourth engagement portion capable of being engaged with a fourth protruding portion that is provided at the other outer edge opposed to the one outer edge via the light-transmitting portion, and that protrudes from the second center line in a direction of the other outer edge; and a frame that allows the fourth protruding portion to come into contact therewith.

* * * * *